(12) United States Patent
Kim et al.

(10) Patent No.: US 8,811,617 B2
(45) Date of Patent: Aug. 19, 2014

(54) EFFICIENT SECURITY-RELATED PROCESSING

(75) Inventors: Sun Hee Kim, Anyang-si (KR); Seung June Yi, Anyang-si (KR); Sung Jun Park, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 334 days.

(21) Appl. No.: 13/265,782

(22) PCT Filed: Apr. 19, 2010

(86) PCT No.: PCT/KR2010/002402
§ 371 (c)(1),
(2), (4) Date: Oct. 21, 2011

(87) PCT Pub. No.: WO2010/123230
PCT Pub. Date: Oct. 28, 2010

(65) Prior Publication Data
US 2012/0039471 A1 Feb. 16, 2012

Related U.S. Application Data

(60) Provisional application No. 61/171,440, filed on Apr. 21, 2009.

(30) Foreign Application Priority Data

Apr. 16, 2010 (KR) .................. 10-2010-0035221

(51) Int. Cl.
*H04K 1/00* (2006.01)
*H04W 12/02* (2009.01)
*H04W 12/10* (2009.01)

(52) U.S. Cl.
CPC .................................. *H04W 12/10* (2013.01); *H04W 12/02* (2013.01)
USPC ............................ 380/270; 380/239; 380/252

(58) Field of Classification Search
USPC ............................ 380/270, 239, 252; 370/271
See application file for complete search history.

(56) References Cited

U.S. PATENT DOCUMENTS

| | | | | |
|---|---|---|---|---|
| 4,052,565 A * | 10/1977 | Baxter et al. | ................... | 380/28 |
| 7,471,943 B2 * | 12/2008 | Chun et al. | ................... | 455/410 |
| 7,707,415 B2 * | 4/2010 | Braskich et al. | ............. | 713/168 |
| 7,747,025 B1 * | 6/2010 | Trimberger | ................ | 380/284 |
| 7,965,836 B2 * | 6/2011 | Ahn et al. | ...................... | 380/28 |
| 2005/0207571 A1 * | 9/2005 | Ahn et al. | ...................... | 380/28 |
| 2006/0088161 A1 * | 4/2006 | Hashimoto et al. | ........... | 380/201 |
| 2008/0063205 A1 * | 3/2008 | Braskich et al. | ............. | 380/270 |
| 2008/0226074 A1 | 9/2008 | Sammour et al. | | |
| 2009/0034507 A1 | 2/2009 | Chang et al. | | |
| 2010/0146274 A1 * | 6/2010 | Naslund et al. | ............... | 713/168 |

FOREIGN PATENT DOCUMENTS

KR 1020050073904 7/2005
WO 2008/114993 9/2008

* cited by examiner

*Primary Examiner* — Amare F Tabor
(74) *Attorney, Agent, or Firm* — Lee, Hong, Degerman, Kang & Waimey

(57) ABSTRACT

An efficient security related procedure is disclosed. A plurality of service data units (SDUs) having the same priority is multiplexed to one unit signal. The unit signal is ciphered using a mask generated by a first parameter combination. The receiver simultaneously deciphers the multiplexed service data units (SDUs), such that a Layer-2 (L2) processing time is efficiently reduced and the problems encountered by signals vulnerable to security can be efficiently solved.

12 Claims, 19 Drawing Sheets

EFFICIENT SECURITY-RELATED PROCESSING

CROSS-REFERENCE TO RELATED APPLICATIONS

This application is the National Stage filing under 35 U.S.C. 371 of International Application No. PCT/KR2010/002402, filed on Apr. 19, 2010, which claims the benefit of earlier filing date and right of priority to Korean Application No. 10-2010-035221, filed on Apr. 16, 2010, and also claims the benefit of U.S. provisional application 61/171,440, filed on Apr. 21, 2009, the contents of which are all hereby incorporated by reference herein in their entirety.

TECHNICAL FIELD

The present invention relates to a method and apparatus for efficiently performing encryption and decryption in a mobile communication system, and performing an integrity check, thereby transmitting and receiving signals.

BACKGROUND ART

First, a variety of mobile communication systems applicable to the present invention will hereinafter be described in detail.

A Universal Mobile Telecommunications System (UMTS) network configuration applicable to the present invention will be described below.

FIG. 1 illustrates a UMTS network configuration.

Referring to FIG. 1, a UMTS system includes a User Equipment (UE), a UMTS Terrestrial Radio Access Network (UTRAN), and a Core Network (CN). The UTRAN includes one or more Radio Network Sub-systems (RNSs) each having a Radio Network Controller (RNC) and one or more base stations (Node Bs) managed by the RNC. One or more cells may exist per a single base station (Node B).

A radio protocol architecture for the UMTS will be described with reference to FIG. 2. FIG. 2 illustrates a radio protocol architecture for UMTS. Pairs of radio protocol layers exist in the UE and the UTRAN, and perform data transfer over an air interface. In the radio protocol layers, a physical (PHY) layer, which is a first layer (L1), is responsible for data transfer over an air interface using various radio transfer technologies. The PHY layer is connected to a medium access control (MAC) layer, which is a higher layer, through a transport channel, and the transport channel is divided into a dedicated transport channel and a common transport channel depending on whether or not the channel is shared.

A MAC layer, a radio link control (RLC) layer and a broadcast and multicast control (BMC) layer exist in a second layer (L2). The MAC layer maps various logical channels to various transport channels and performs logical channel multiplexing to map a plurality of logical channels to one transport channel. The MAC layer is connected to the RLC layer, which is a higher layer, through a logical channel. The logical channel is divided into a control channel for transmitting information on a control plane and a traffic channel for transmitting information on a user plane, according to the kind of transmitted information.

In addition, the MAC layer is divided into a MAC-b sublayer, a MAC-d sublayer, a MAC-c/sh sublayer, a MAC-hs/ehs sublayer, and a MAC-e/es or a MAC-i/is sublayer, according to the kind of the managed transport channel. The MAC-b sublayer is responsible for management of a Broadcast Channel (BCH) which is a transport channel for broadcasting system information, the MAC-c/sh sublayer is responsible for management of a Forward Access Channel (FACH) common transport channel shared with the other UEs, and the MAC-d sublayer is responsible for management of either a Dedicated Channel which is a dedicated transport channel of a specific UE or a Dedicated Enhanced Dedicated Channel (Dedicated E-DCH). In addition, the MAC-hs/ehs sublayer manages a High Speed Downlink Shared Channel (HS-DSCH) for high-speed downlink data transmission and the MAC-e/es or MAC-i/is sublayer manages an Enhanced Dedicated Channel (E-DCH) which is a transport channel for high-speed uplink data transmission.

The RLC layer ensures the Quality of Service (QoS) of Radio Bearers (RBs) and is responsible for data transmission. The RLC layer has one or two independent RLC entities for each RB in order to ensure QoS. To support various QoS levels, the RLC layer provides three RLC modes, Transparent Mode (TM), Unacknowledged Mode (UM), and Acknowledged Mode (AM). In addition, the RLC layer controls a data size to suit radio data transmission at a lower layer. For controlling a data size, the RLC layer segments or concatenates data received from a higher layer.

The PDCP layer is located above the RLC layer. The PDCP layer enables efficient data transmission in IP packets such as IP version 4 (IPv4) or IP version 6 (IPv6) packets on a radio link having a relatively narrow bandwidth. For this purpose, the PDCP layer performs header compression. Since only necessary information is transmitted in the header of data header through header compression, the transmission efficiency of the radio link is increased. The PDCP layer exists mainly in a Packet Switched (PS) domain because header compression is it basic function. To provide an efficient header compression function for each PS service, one PDCP entity is defined for each RB. However, if the PDCP layer exists in a Circuit Switched (CS) domain, the PDCP layer does not provide the header compression function.

In the second layer, a Broadcast/Multicast Control (BMC) layer is located at a level above the RLC layer so as to perform a function for scheduling a cell broadcast message and broadcasting the cell broadcast message to UEs located in a specific cell.

A Radio Resource Control (RRC) layer located at the lowermost level of the third layer (L3) is defined only in the control plane and is responsible for control of the parameters of the first layer and the second layer in association with configuration, re-configuration and release of Radio Bearers (RBs), and is responsible for control of the logical, transport and physical channels. The RB is a logical path that the first and second layers of the radio protocol provide for data communication between the UE and the UTRAN. Generally, Radio Bearer (RB) configuration means that a radio protocol layer necessary to provide a specific service and channel characteristics are defined and their detailed parameters and operation methods are configured.

A Non Access Stratum (NAS) layer located at a higher level of the third layer (L3) includes a Mobility Management (MM) entity and a Connection Management (CM) entity. The MM entity performs a Temporary Mobile Subscriber Identity (TMSI) reordering process, an authentication process, a UE identification process, an International Mobile Subscriber Identity (IMSI) appending process, etc., identifies each UE, and manages several UEs. In addition, the MM entity manages current location information of a UE through a location information updating process. The CM entity provides and controls a service provided by a network. Accordingly, the CM entity performs connection establishment, management and termination of a voice call, connection establishment, management and termination of session corresponding to data communication and provision and control of a Short Message Service (SMS), or connection establishment, management and termination of a supplementary service.

The RRC and NAS messages are transmitted through a logical path called a signaling radio bearer (SRB). SRB#0 is used to transmit all RRC messages transmitted through a CCCH logical channel. SRB#1, SRB#2, SRB#3, SRB#4 are used to transmit all RRC or NAS messages transmitted through a DCCH logical channel. SRB#1 and SRB#2 are used to transmit the RRC message, and SRB#3 and SRB#4 are used to transmit the NAS message.

Next, a Long Term Evolution (LTE) system applicable to the present invention will hereinafter be described below.

The LTE system has evolved from a legacy UMTS, basic standardization thereof is now being conducted by the 3rd Generation Partnership Project (3GPP), and a representative LTE system structure thereof is shown in FIG. 3.

FIG. 3 is a conceptual diagram illustrating an LTE system.

Referring to FIG. 3, the LTE system can be generally classified into an Evolved UMTS (E-UTRAN) and an Evolved Packet Core (EPC). The E-UTRAN includes a UE and an Evolved Node-B (eNB). An interface between a UE and an eNB is referred to as a Uu interface, and an interface between eNBs is referred to as an X2 interface.

The EPC may include a mobility management entity (MME) and a serving gateway (S-GW). An interface between an eNB and an MME is referred to as S1-MME interface, and an interface between an eNB and an S-GW is referred to as an S-U interface, and a generic term of the two interfaces may also be called an S1 interface.

A radio interface protocol is defined in the Uu interface acting as an air interface. The radio interface protocol includes a physical layer, a data link layer, and a network layer in a horizontal direction. In a vertical direction, the radio interface protocol includes a user plane for transmitting data information and a control plane for transmitting a control signal (i.e., a signaling message). The protocol layers shown in FIG. 3 may be classified into a first layer (L1) including a physical (PHY) layer, a second layer (L2) including MAC/RLC/PDCP layers, and a third layer (L3) including the RRC layer on the basis of the three lower layers of an Open System Interconnection (OSI) reference model well known in the field of communication systems. The UE and the E-UTRAN include a pair of such radio protocol layers, and are used to transmit data via an air interface.

FIGS. 4 and 5 illustrate a control plane and a user plane (U-Plane) of the LTE system radio protocol.

Functions of individual layers will hereinafter be described with reference to FIGS. 4 and 5.

A physical (PHY) layer serving as the first layer (L1) transmits an information transfer service to a higher layer over a physical channel. The physical (PHY) layer is connected to a Medium Access Control (MAC) layer serving as a higher layer over a transport channel. Through the transport channel, data is transferred from the MAC layer to the physical layer or is also transferred from the physical layer to the MAC layer. In this case, the transport channel is largely classified into a dedicated transport channel and a common transport channel depending on whether or not the channel is shared. In addition, data is transferred between different PHY layers (i.e., between a PHY layer of a transmitter and a PHY layer of a receiver) over a physical channel using radio resources.

A variety of layers exist in the second layer (L2). The MAC layer maps various logical channels to various transport channels and performs logical channel multiplexing to map a plurality of logical channels to one transport channel. The MAC layer is connected to the RLC layer, which is a higher layer, through a logical channel. The logical channel is divided into a control channel for transmitting information on a control plane and a traffic channel for transmitting information on a user plane, according to the kind of transmitted information.

The radio link control (RLC) layer of the L2 layer segments and concatenates data received from a higher layer, such that it controls a data size to suit radio data transmission at a lower layer. For controlling a data size, the RLC layer segments or concatenates data received from a higher layer. To support various QoS levels requisite for various radio bearers (RBs), the RLC layer provides three RLC modes, Transparent Mode (TM), Unacknowledged Mode (UM), and Acknowledged Mode (AM). Specifically, an AM RLC performs a retransmission function using an Automatic Repeat and Request (ARQ) function so as to implement reliable data transmission.

The packet data convergence protocol (PDCP) layer of the L2 layer enables efficient data transmission in IP packets such as IP version 4 (IPv4) or IP version 6 (IPv6) packets on a radio link having a relatively narrow bandwidth. For this purpose, the PDCP layer performs header compression to reduce the size of an IP packet header including relatively large and unnecessary control information. Since only necessary information is transmitted in the header of data header through header compression, the transmission efficiency of the radio link is increased. In addition, in the LTE system, the PDCP layer performs a security function, this security function is composed of a ciphering function (also called an encryption function) for preventing a third party from eavesdropping data and an integrity protection function for preventing a third party from handling data.

In the LTE system, the ciphering, deciphering and integrity check are performed in the PDCP layer, such that the LTE system may have an input parameter value different from that of the UMTS.

The Radio Resource Control (RRC) layer located at the top of the third layer (L3) is defined only in the control plane and is responsible for control of logical, transport, and physical channels in association with configuration, reconfiguration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C-plane, and the DRB is used as a transmission passage of user data in the U-plane.

FIG. 6 illustrates a bearer service structure for use in the LTE system.

Referring to FIG. 6, the RB is a bearer provided in the Uu interface so as to support a user service. The 3GPP system has defined bearers of individual interfaces, and has guaranteed independency between interfaces. In more detail, a generic term of bearers provided by the LTE system is an Evolved Packet System (EPS) bearer, and the EPS bearer is classified into a radio bearer (RB) and an S1 bearer for each interface as shown in FIG. 6.

In FIG. 6, a Packet Gateway (P-GW) is a network node for connecting an LTE network to another network, and an EPS bearer provided by the LTE system is defined between a UE and a P-GW. The EPS bearer is further segmented between respective nodes of the LTE system, a bearer between a UE and an eNB is defined as a radio bearer (RB), a bearer between an eNB and an S-GW is defined as an S1 bearer, and a bearer between internal S-GW and P-GW of the EPC is defined as an S5/S8 bearer. Each bearer is defined as a QoS. In this case, the QoS includes a data rate, an error rate, a delay, etc. Accordingly, provided that a QoS to be provided by the LTE system is defined as an EPS bearer, different QoSs are assigned to individual interfaces, and each interface may establish a bearer in response to its unique QoS. Bearers of individual interfaces are designed to divisionally provide individual parts of a QoS of the entire EPS bearer. The EPS bearer, other radio bearers, the S1 bearer, etc. are connected in a one to one basis.

Next, the Long Term Evolution Advanced (LTE-A) system applicable to the present invention will hereinafter be described below.

The LTE-A system has evolved from the LTE system according to the IMT-advanced condition acting as the fourth-generation mobile communication condition recommended by the International Telecommunication Union-Radiocommunication sector (ITU-R), the LTE-A system standardization is now being conducted in the 3GPP that has developed the current LTE system standard.

Representative technologies newly added to the LTE-A system may include a carrier aggregation (CA) technology that extends or flexibly utilizes a bandwidth, a relay technology for increasing coverage, supporting group mobility, and enabling UE-purposed network arrangement, etc.

The relay is used as an intermediary in data between a UE and an eNB. In the LTE system, if the UE is very far from the eNB, communication is not smoothly performed. In order to overcome the above-mentioned problem, the relay has been introduced to the LTE-A system. In order to perform the above-mentioned relay function, a new network node known as a relay node (RN) has been introduced between a UE and an eNB. In this case, the eNB configured to manage the RN is referred to as a donor eNB (DeNB). In addition, the interface between an RN and a DeNB is defined as an Un interface, differently from the Uu interface acting as the interface between a UE and a network node.

FIG. 7 is a conceptual diagram illustrating the relay node (RN) discussed in the LTE-A system and the Un interface.

Referring to FIG. 7, the RN manages a UE on behalf of a donor eNB (DeNB). In other words, from the viewpoint of the UE, the RN operates as a DeNB. Accordingly, MAC/RLC/PDCP/RRC acting as the Uu interface protocols used in the legacy LTE system may be used in the Uu interface between the UE and the RN without any change.

From the viewpoint of the DeNB, the RN may operate as a UE or an eNB according to conditions. That is, when the relay node initially gains access to the DeNB, since the DeNB is not aware of the presence of the RN, the RN can access the DeNB through random access in the same manner as in the UE. After the RN has accessed the DeNB, the RN operates in the same manner as the eNB that manages the UE connected to the RN itself. Therefore, the Un interface protocol needs to be defined as the sum of the Uu interface protocol function and the network protocol function. Presently, the 3GPP has discussed, in association with the Un protocol, information as to which function must be added to or changed in each protocol layer on the basis of the Uu protocol such as MAC/RLC/PDCP/RRC.

DISCLOSURE

Technical Problem

In the above-mentioned systems, a large amount of user data and variety messages are communicated between a UE and a network, between a UE and a relay node (RN), or between an RN and a network. In order to protect much user data and various messages, it is necessary to perform a security check in most cases. The security check includes an encryption/decryption (also known as ciphering/deciphering) check and an integrity check.

The encryption or ciphering process adds a specific MASK known to both a transmitter and a receiver to a message such that it prevents a third party that does not know the MASK from recognizing or eavesdropping the message. For example, a transmission UE or UTRAN transmits general user data (i.e., user data) simultaneously while preventing a third party from recognizing general user data (i.e., user data) through the ciphering process, and a reception UE or UTRAN receives encrypted data through the decryption (or deciphering) process such that it can decipher the encrypted data.

Differently from the ciphering or deciphering, the integrity check is used to confirm that a transmission message is unchanged on the way and is not received from an unauthenticated place. That is, the integrity check is used to determine whether or not content of a received message is unexpectedly changed by a third party. The security check such as the ciphering or integrity check may be adapted to prevent a third party from fraudulently obtaining information of a specific person through hacking. The above-mentioned personal information leak prevention is of very importance to each person who lives in a modern society considered to be the information society.

However, the above-mentioned deciphering or decryption process for use in the UMTS is carried out in the RLC layer. The MAC layer (specifically, MAC-ehs) performs reordering/reassembly according to the order of transmission sequence numbers (TSNs) of the received MAC PDU. If TSNs of the received MAC PDUs are not contiguous to each other, a specific timer (T1 timer) starts operation, and an MAC PDU having a non-contiguous TSN may be temporarily stored in a buffer. Provided that the MAC PDUs having contiguous TSNs are not received until the specific timer (T1 timer) has expired, the MAC PDUs stored in the buffer are simultaneously delivered to the RLC layer. The deciphering (or decryption) or decoding process time of the RLC layer that have simultaneously received the MAC PDUs unavoidably increases the second layer (L2) processing time. The reason why the second layer is of importance is that a UE can receive data every TTI. Accordingly, the UE has to process received data within one TTI. If the L2 processing time is longer than one TTI, the L2 processing time must be set to one TTI or less using a higher-performance DSP, resulting in increased production costs of the UE.

In addition, the UMTS does not perform encryption/decryption (or ciphering/deciphering) in units of specific data, such that the UMTS is vulnerable to security.

The above-mentioned UMTS problems, i.e., an increased L2 processing time, vulnerable security, etc. can be applied to the LTE system and the LTE-A system, such that there is needed an efficient security related procedure to solve the above-mentions problems,

Technical Solution

To achieve these objects and other advantages and in accordance with the purpose of the invention, as embodied and broadly described herein, a method for allowing a transmitter to transmit a signal to a receiver over a radio frequency (RF) channel includes multiplexing a plurality of service data units (SDUs) having the same priority to one unit signal; ciphering the unit signal using a mask generated by a first parameter combination; and transmitting the ciphered unit signal to the receiver over the RF channel.

The method may further include adding an integrity check authentication value signal generated using a second parameter combination to the unit signal multiplexed by the multiplexing step, wherein the unit signal ciphered by the ciphering step is obtained by adding the integrity check authentication value signal to the multiplexed unit signal.

The plurality of service data units (SDUs) having the same priority may be mapped to the same radio bearer (RB).

The transmitter may be a relay node (RN) and the receiver may be a base station. In the multiplexing step, the relay node (RN) multiplexes the service data units (SDUs) mapped to the same radio bearer (RB) from service data units (SDUs) of a plurality of user equipments (UEs) to one multiplexed service data unit (SDU).

The method may further include adding, by the relay node (RN), an integrity check authentication value signal generated using a second parameter combination to the multiplexed service data unit (SDU), and wherein the unit signal ciphered by the ciphering step is obtained by adding the integrity check authentication value signal to the multiplexed service data unit (SDU).

The first parameter combination may include a ciphering key (CK), a count value, a radio bearer identifier (RB ID) corresponding to the multiplexed service data unit (SDU), and a length of the mask. The second parameter combination may include a key, a count value, a message indicating the multiplexed service data unit (SDU), a direction parameter indicating whether the signal transmission is uplink transmission or downlink transmission, and a radio bearer identifier (RB ID) corresponding to the multiplexed service data unit (SDU).

The multiplexing step may include multiplexing a plurality of service data units (SDUs) mapped to a plurality of radio bearers (RBs) having the same priority in a medium access control (MAC) layer of the transmitter to one multiplexed service data unit (SDU).

In another aspect of the present invention, a method for allowing a receiver to receive a signal from a transmitter over a radio frequency (RF) channel includes receiving a ciphered unit signal from the transmitter over the RF channel; deciphering the ciphered unit signal using a mask generated by a first parameter combination; and obtaining a plurality of service data units (SDUs) having the same priority from the deciphered unit signal.

The obtaining of the plurality of service data units (SDUs) may include comparing a transmitter's integrity check authentication value contained in the deciphered unit signal with a receiver's integrity check authentication value generated by a second parameter combination.

The plurality of service data units (SDUs) having the same priority may be mapped to the same radio bearer (RB).

The transmitter may be a relay node (RN) and the receiver may be a base station. In the obtaining of the plurality of service data units (SDUs), the base station may obtain service data units (SDUs) of a plurality of user equipments (UEs) mapped to the same radio bearer (RB).

The base station may compare a transmitter's integrity check authentication value contained in the deciphered unit signal with a receiver's integrity check authentication value generated by a second parameter combination, and discard the deciphered unit signal when the transmitter's integrity check authentication value is different from the receiver's integrity check authentication value.

The first parameter combination may include a ciphering key (CK), a count value, a radio bearer identifier (RB ID) corresponding to the multiplexed service data unit (SDU), and a length of the mask. The second parameter combination may include a key, a count value, a message indicating the multiplexed service data unit (SDU), a direction parameter indicating whether the signal transmission is uplink transmission or downlink transmission, and a radio bearer identifier (RB ID) corresponding to the multiplexed service data unit (SDU).

The obtaining of the plurality of service data units (SDUs) may include obtaining a plurality of service data units (SDUs) mapped to a plurality of radio bearers (RBs) having the same priority in a medium access control (MAC) layer of the receiver.

Advantageous Effects

As apparent from the above description, exemplary embodiments of the present invention can efficiently reduce a processing time requisite for the ciphering/deciphering (encryption/decryption) processing time and the integrity check, and can also efficiently solve the conventional problems encountered by signals vulnerable to security.

DESCRIPTION OF THE DRAWINGS

The accompanying drawings, which are included to provide a further understanding of the invention, illustrate embodiments of the invention and together with the description serve to explain the principle of the invention.

In the drawings.

BEST MODE

Figure 1:
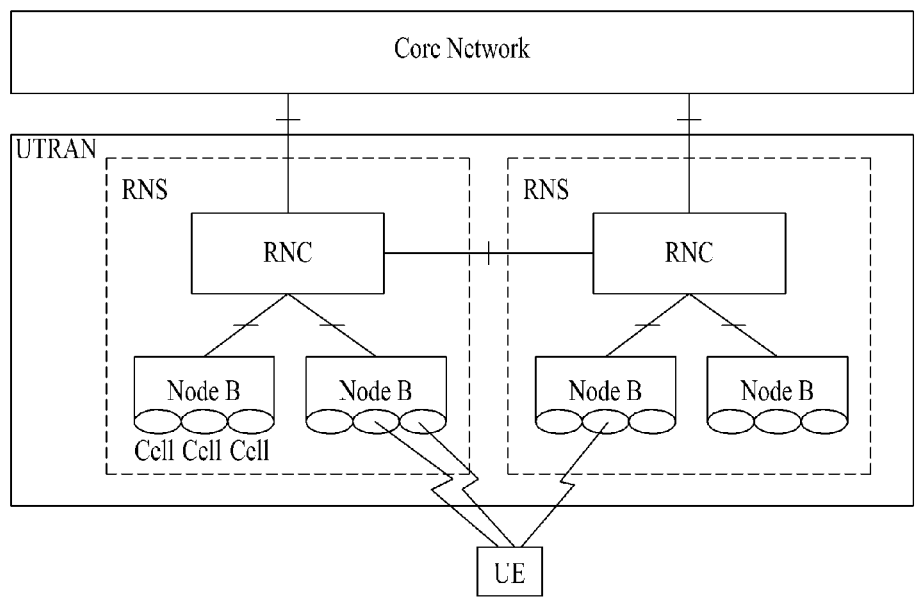
FIG. 1 illustrates a UMTS network configuration.
Figure 2:
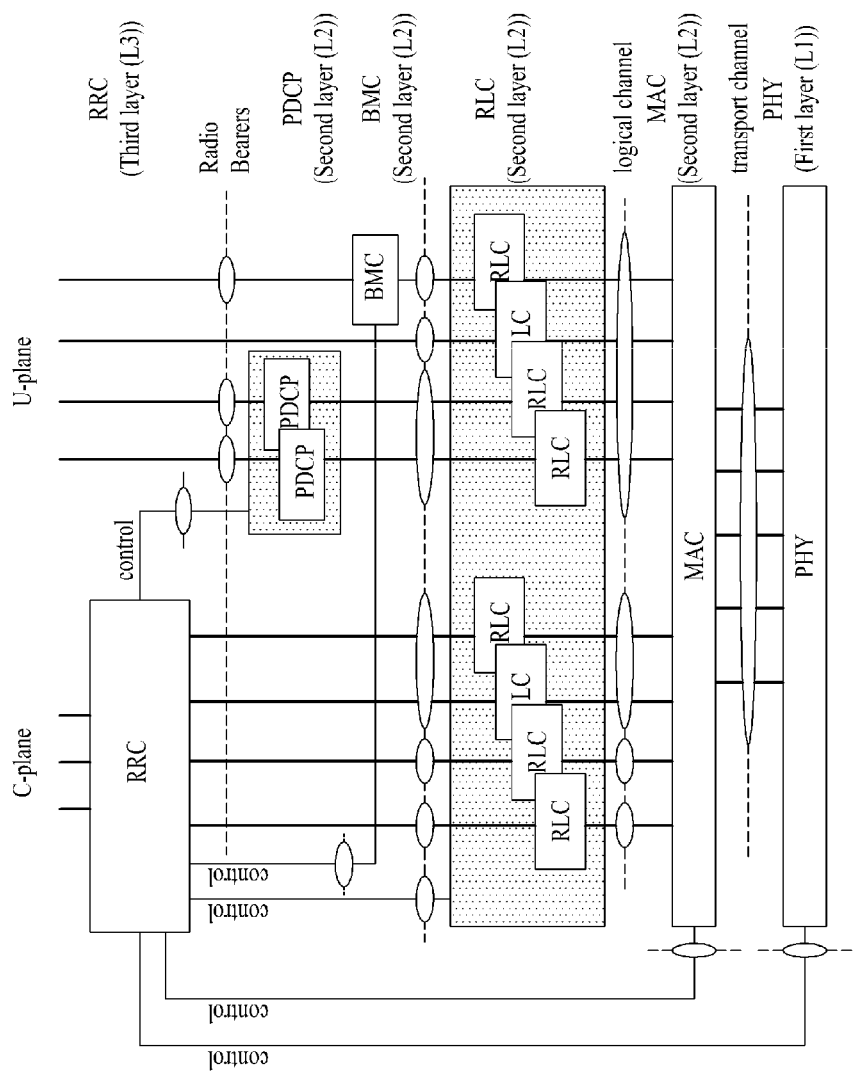
FIG. 2 illustrates a radio protocol architecture for UMTS.
Figure 3:
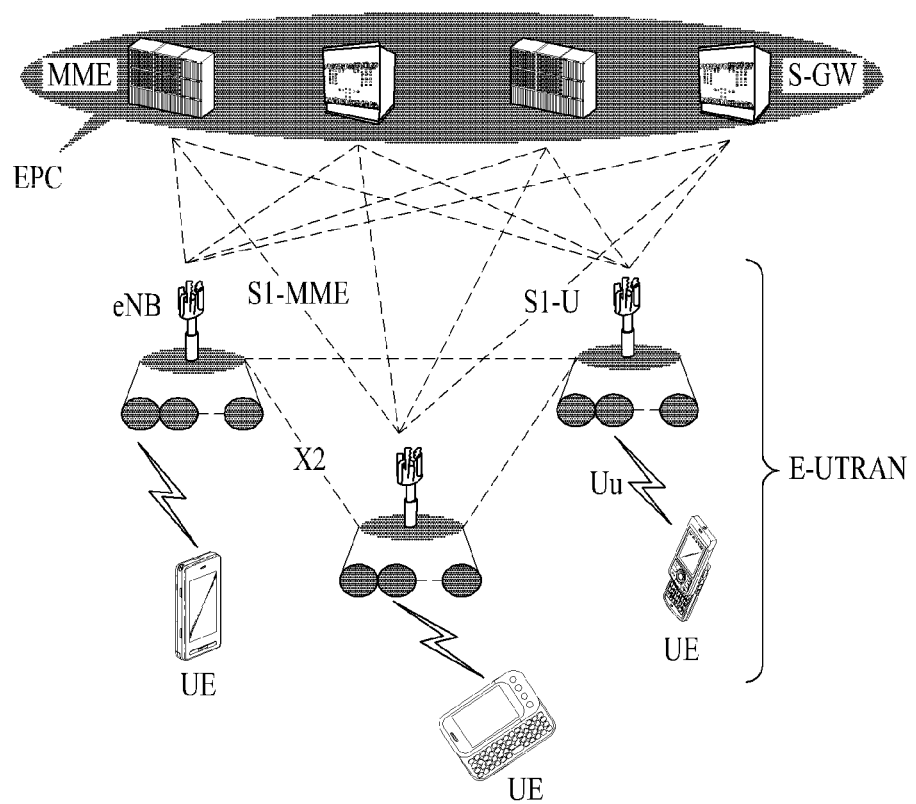
FIG. 3 is a conceptual diagram illustrating an LTE system.
Figure 4:
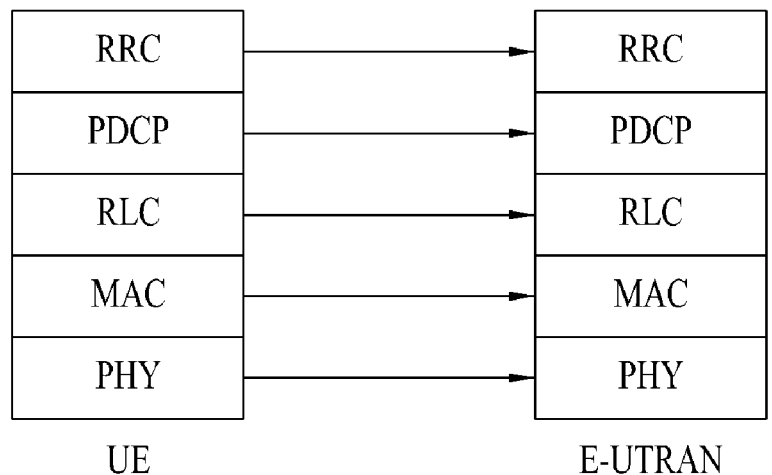
FIGS. 4 and 5 illustrate a control plane and a user plane (U-Plane) of the LTE system radio protocol.
Figure 5:
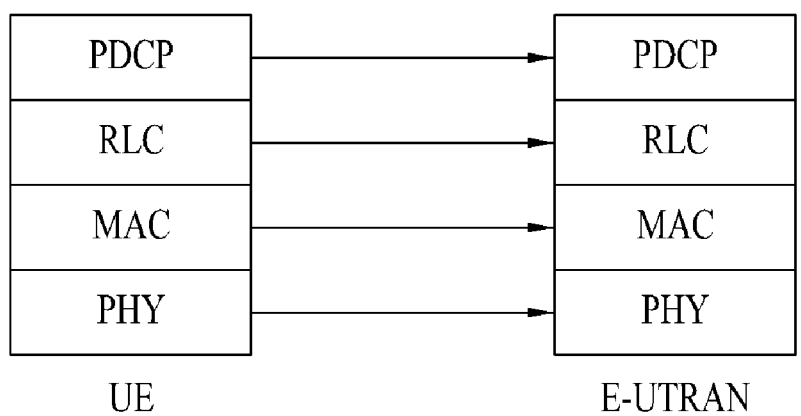
Figure 6:
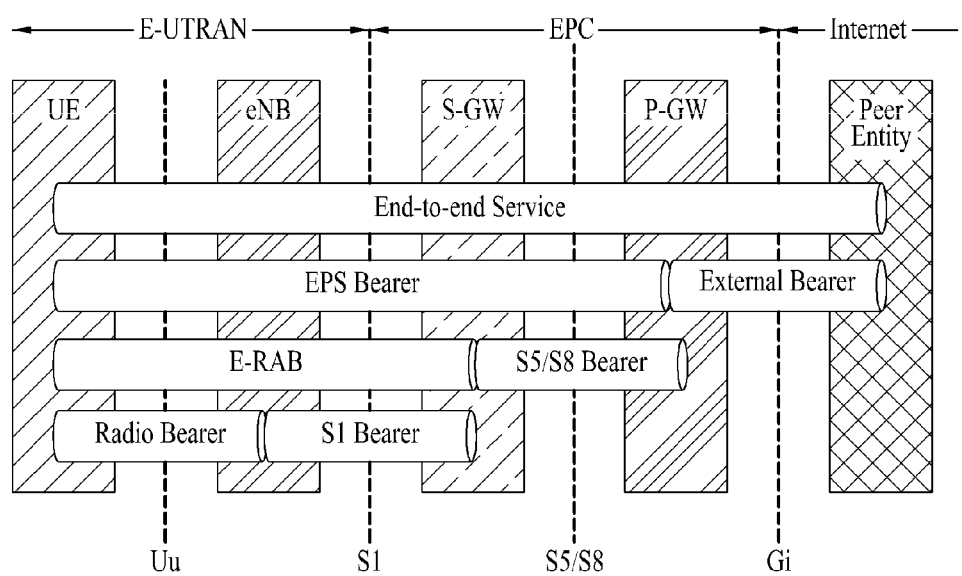
FIG. 6 illustrates a bearer service structure for use in the LTE system.
Figure 7:
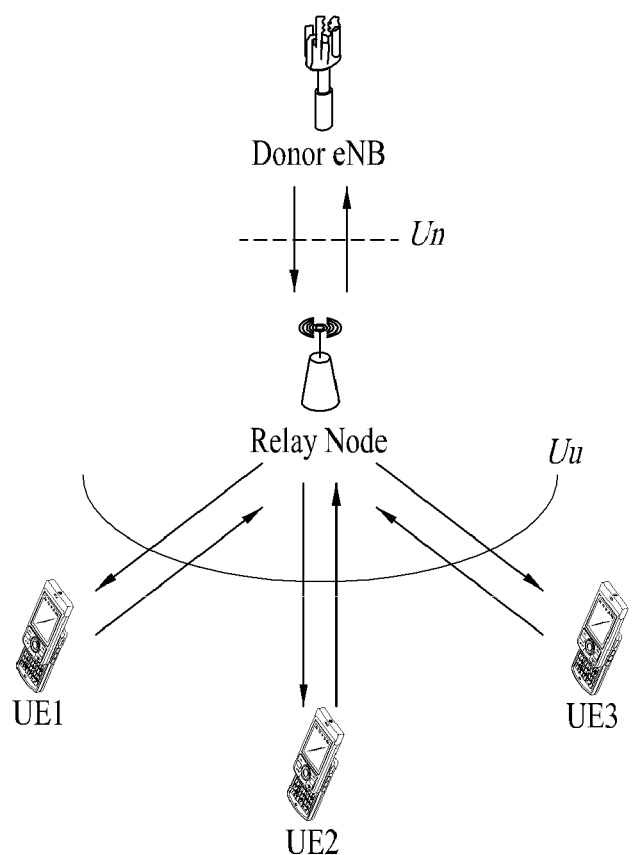
FIG. 7 is a conceptual diagram illustrating a relay node (RN) discussed in the LTE-A system and an Un interface.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering upon UMTS, LTE, and LTE-A systems, but the present invention is not limited thereto and the remaining parts of the present invention other than unique characteristics of the individual systems are applicable to other mobile communication systems.

In some cases, in order to prevent ambiguity of the concepts of the present invention, conventional devices or apparatuses well known to those skilled in the art will be omitted and be denoted in the form of a block diagram on the basis of the important functions of the present invention. Wherever possible, the same reference numbers will be used throughout the drawings to refer to the same or like parts.

In the following description, a terminal may include mobile or fixed user equipments (UEs), for example, a user equipment (UE), a mobile station (MS) and the like, and may also be referred to in any of these ways as necessary. Also, a base station (BS) may refer to an arbitrary node of a network end which communicates with the above terminal, and may include a Node B (Node-B), an eNode B (eNB) and the like. The term "relay" may be replaced with a Relay Node (RN) or a Relay Station (RS). A downlink of the Un interface may be referred to as a DL Un, and an uplink of the Un interface may be referred to as a UL Dn. A downlink of the Uu interface may be referred to as a DL Uu and an uplink of the Uu interface may be referred to as a UL Uu.

The ciphering/deciphering (encryption/decryption) process for use in the UMTS will hereinafter be described in detail.

The ciphering/deciphering (or encryption/decryption) process for use in the current UMTS is carried out in the RLC or MAC layer. If a radio bearer (RB) to which data to be encrypted is mapped uses a transparent mode (TM), the encryption process is performed in the MAC layer. If a radio bearer (RB) to which data to be encrypted is mapped is not in the TM, i.e., if the RB uses an Acknowledged Mode (AM) or an unacknowledged Mode (UM), the ciphering process is carried out in the RLC layer.

Information requisite for the ciphering process is as follows.

(1) Ciphering Key (CK): The ciphering key (CK) means an encryption key that is generated through an authentication process of a higher layer of the RRC and is then recognized by the RRC. The CK is not transmitted through an air interface, and is calculated by a higher part of a UE RRC and a higher part of a network RRC on the basis of different specified input values.

(2) COUNT-C: COUNT-C means a serial number for performing the ciphering process, and has the same structure as in FIG. 8.

Figure 8:
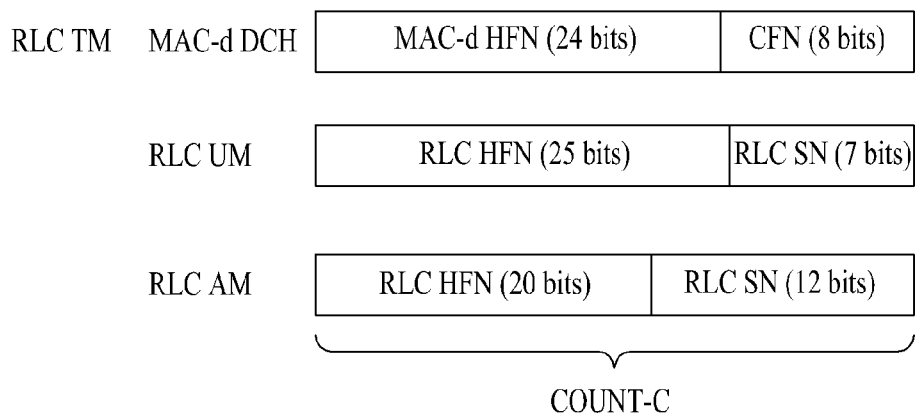
FIG. 8 is a diagram illustrating a COUNT-C structure depending on an RLC entity.

FIG. 8 is a diagram illustrating a COUNT-C structure depending on an RLC entity.

Referring to FIG. 8, the COUNT-C structure includes two regions. If COUNT-C is encrypted or ciphered in the RLC layer, a higher region (i.e., an MSB direction, See the left part of FIG. 8) is called an RLC Hyper Frame Number (HFN), and a lower region (i.e., LSB direction, See the right part of FIG. 8) is called an RLC Sequence Number (SN). If the ciphering or encryption is performed in the MAC layer, the higher layer is a MAC-d HFN and the lower layer is a Connection Frame Number (CFN). Each RLC HFN or each MAC-d HFN is initialized to either a START value that is finally transmitted from the UE to the UTRAN or zero. When a UE starts RRC connection, the UE may read the START value stored in an SIM card and transmit the read START value to the UTRAN. In addition, the START value may also be used even when a message of a higher layer of the RRC is transmitted. Under the condition that RRC connection is achieved, the highest value from among high-order 20 bits of the current COUNT-C value is defined as the COUNT-C value. If RRC connection is ended, the START value currently used in the RRC is stored in the SIM card. RLC HFN or MAC-d HFN is increased one by one whenever SN or CFN is set to zero.

(3) Bearer: Bearer is composed of 5 bits, and is an identifier for identifying a radio bearer (RB).

(4) Direction or Direction Identifier: a direction or a direction identifier is a direction identifier of 1 bit. In uplink, the direction or the direction identifier is set to 0. In downlink, the direction or the direction identifier is set to 1.

(5) Length: Length is a value composed of 16 bits. Length indicates the length of a MASK value (i.e., the length of a key stream block) for encryption or ciphering. The Length is identical to the length of a plain text that is not encrypted or the length of a ciphered text, and may have any one value from among 1~20000 bits.

Figure 9:
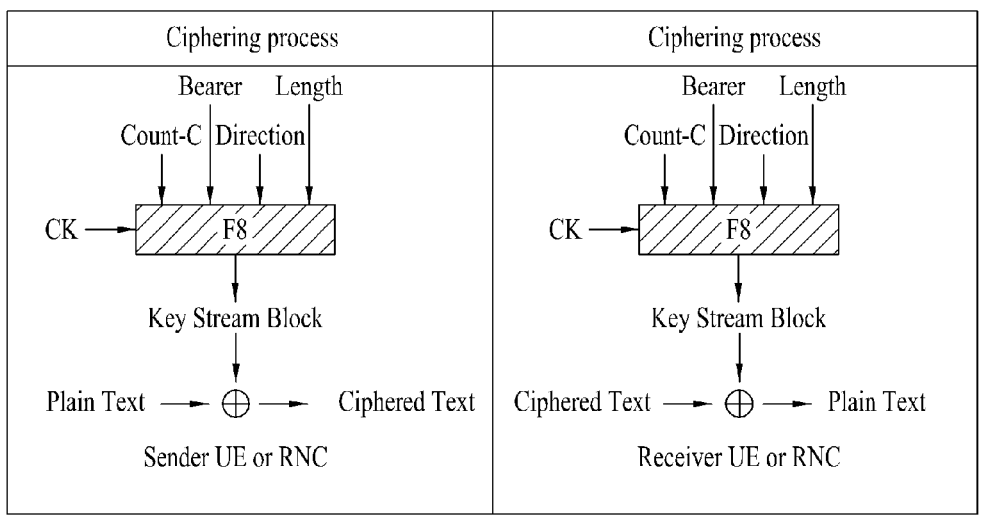
FIG. 9 is a conceptual diagram illustrating a method for ciphering (or encrypting) data using an F8 algorithm acting as the encryption algorithm, and deciphering (or decrypting) the ciphered data.

FIG. 9 is a conceptual diagram illustrating a method for ciphering (or encrypting) data using an F8 algorithm acting as the encryption algorithm, and deciphering (or decrypting) the ciphered data.

Ciphering or deciphering (encryption or decryption) for WCDMA may be divided into two stages. First, the F8 algorithm of FIG. 9 is carried out using a plurality of input parameters, i.e., the above-mentioned CK, COUNT-C, bearer identifier, direction parameter, and length values, thereby obtaining a key stream block. Thereafter, the X-OR operation is applied to the key stream block obtained by the F9 algorithm and the plain text such that the ciphered text is created. A detailed F8 algorithm has been disclosed in the 3GPP TS 35.201 and TS 35.202.

In the deciphering process, the ciphered text is XOR-processed with the key stream block indicating the F8 ciphering algorithm result including a plurality of input parameters, such that the plain text is created.

On the other hand, if a UE receives high-speed packet data using HSDPA, the UE uses the RLC AM or UM mode as an RLC entity.

Figure 10:
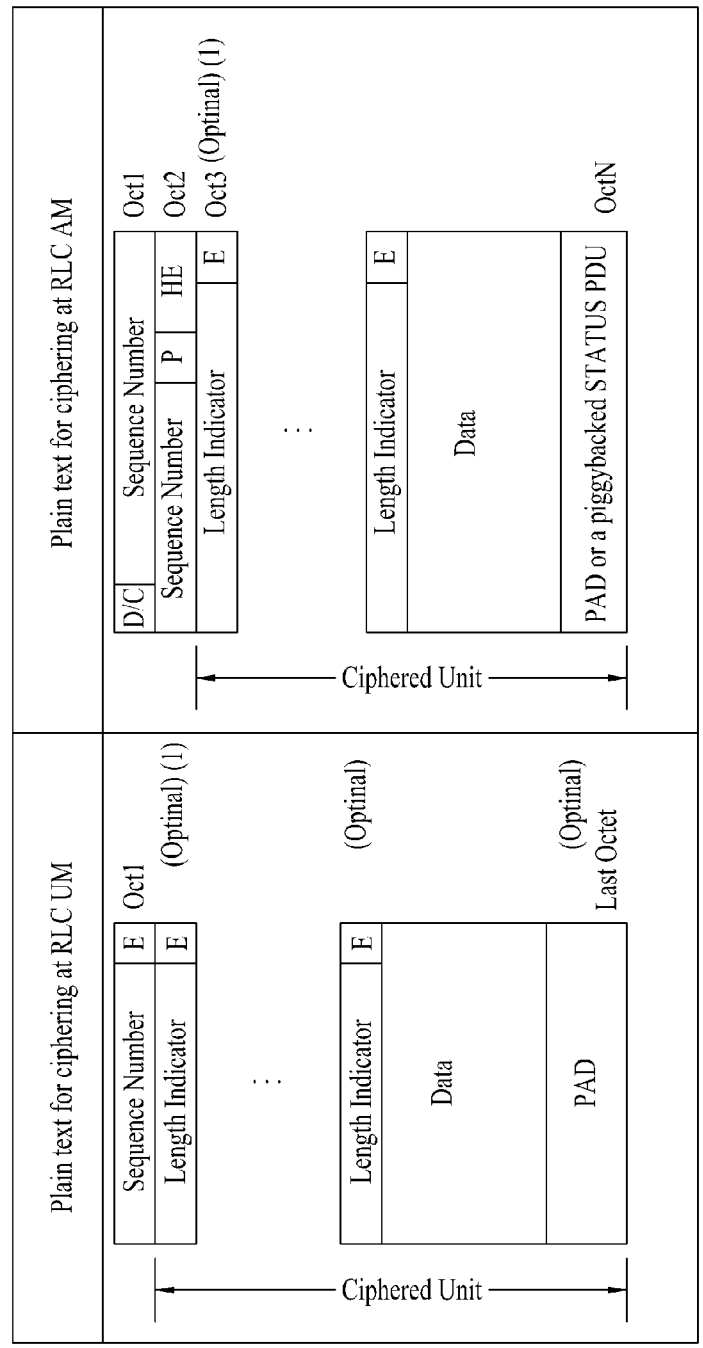
FIG. 10 shows plain text for encryption (or ciphering) in RLC UM/AM modes.

FIG. 10 shows plain text for encryption (or ciphering) in RLC UM/AM modes.

Ciphering parts of individual modes are shown in FIG. 10. The ciphering is carried out in a UMD PDU or AMD PDU as shown in FIG. 10. AMD PDU or UMD PDU is considered to be data received from a higher layer, such that the AMD PDU or UMD PDU is packet data received from a PDCP layer or an RRC or NAS control message received from the RRC layer. Accordingly, the UE does not perform ciphering or deciphering on the RLC PDU but not the AMD PDU or UMD PDU. In this way, RLC PDU for enabling the UE not to perform ciphering and deciphering in an RLC layer will hereinafter be described in detail.

RLC STATUS PDU

RLC STATUS PDU is used to transmit the following control status information between two AM entities. The RLC STATUS PDU is a signal of status information indicating that a peer entity of a receiver has successfully received the AMD PDU from a peer entity of the transmitter.

Through the RLC STATUS PDU, the peer entity of the receiver asks the peer entity of the transmitter to change the size of a transmission window.

The RLC STATUS PDU is an indication signal via which the peer entity of the transmitter can inform the peer entity of the receiver of a message for moving the reception window, or is a response to the indication signal.

RLC RESET/RESET ACK PDU may indicate not only a RESET message between two AM entities but also a response to the RESET message.

MTCH data: MTCH data is used to receive MBMS-associated messages.

Figure 11:
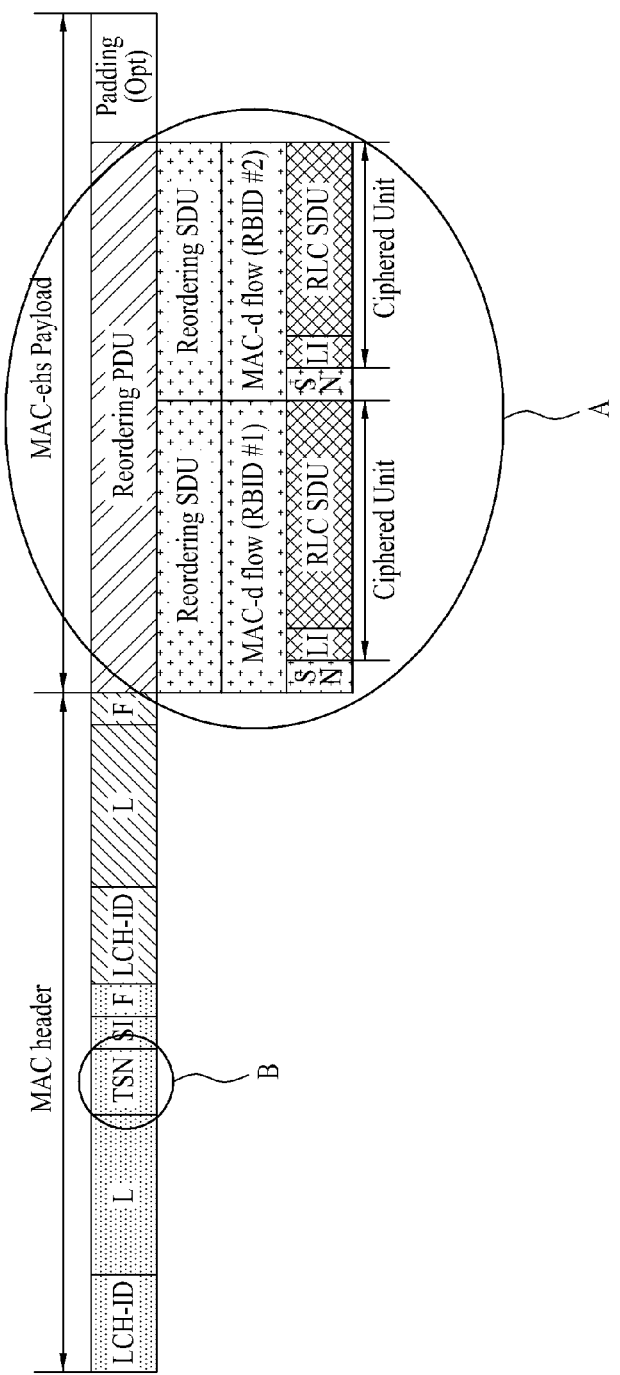
FIG. 11 shows a UE/eNB ciphering unit other than an SN of an RLC PDU corresponding to a reordering SDU from among the reordering PDUs in a MAC-ehs PDU.

As shown in FIG. 10, a UE or eNB may use an RLC PDU part other than a SN of the RLC PDU so as to perform encryption or ciphering, and a detailed description thereof from the viewpoint of MAC PDU is shown in FIG. 11.

Referring to FIG. 11, a UE/eNB ciphering unit may occupy the remaining parts other than the SN of the RLC PDU corresponding to the reordering SDU from among the reordering PDUs in a MAC-ehs PDU.

A process for enabling a UE using a UMTS to receive data and decrypt (or decipher) the received data will hereinafter be described below. For this purpose, the MAC-ehs entity will hereinafter be described below.

Figure 12:
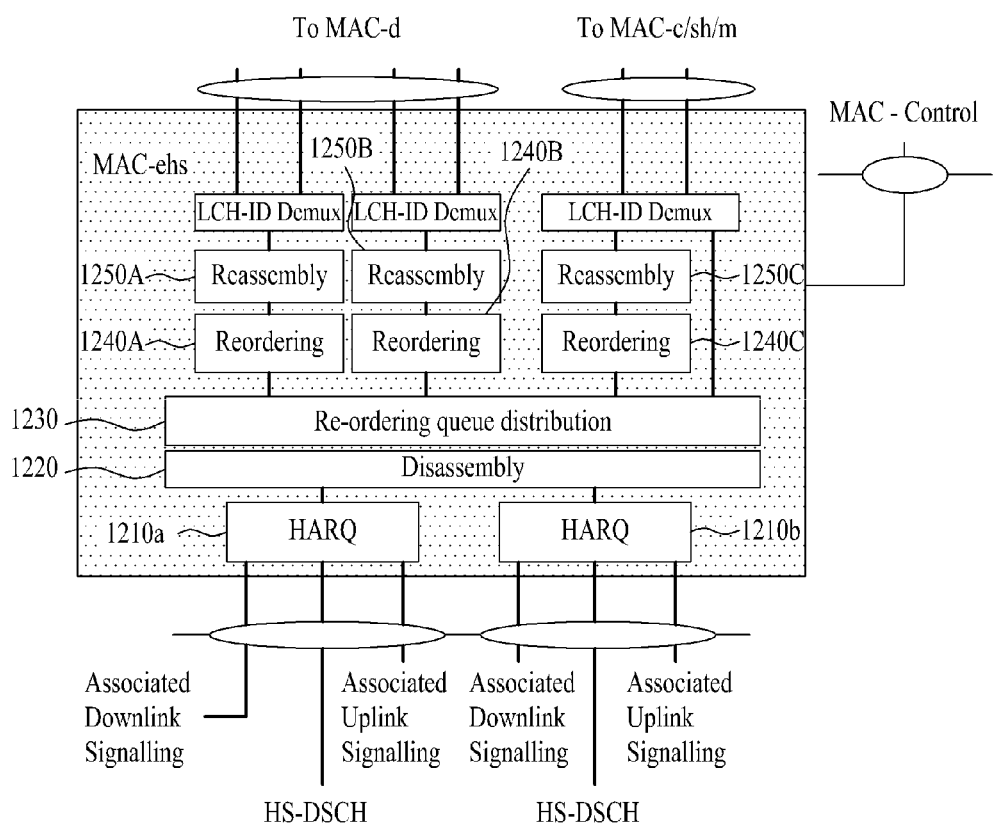
FIG. 12 is a diagram illustrating a MAC-ehs entity structure.

FIG. 12 is a diagram illustrating the MAC-ehs entity structure.

Referring to FIG. 12, provided that a MAC PDU includes user data while the UE receives the MAC PDU from the PHY layer, it may be determined that the MAC PDU received in the UE is encrypted or ciphered. In this case, the UE performs the deciphering process to interpret the ciphered text. If transmission/reception of user data is carried out in the RLC UM entity or RLC AM entity, the deciphering process is achieved in the RLC entity.

Generally, if the UE receives the MAC-ehs PDU from the PHY layer, the MAC-ehs PDU is transmitted to the disassembly entity 1220 through the HARQ entities 1210a and 1210b. The disassembly entity 1220 transmits the reordering PDUs (See the 'A' part in FIG. 11) other than some parts, each of which includes header and padding parts, from among the MAC-ehs PDU to a high-order reordering queue distribution entity 1230. The reordering PDUs transmitted to the reordering queue distribution entity 1230 are transmitted to individual reordering entities 1240A, 1240B and 1240C in response to queue IDs of the above-mentioned reordering PDUs.

If it is determined that a TSN (See 'B' of FIG. 11) of the reordering PDU received in the UE is contiguous to a TSN of the previously received reordering PDU, the reordering entity 1240 transmits the received result to the high-order reassembly entity 1250. If a TSn fo the received reordering PDU is not contiguous to a TSN of the previously received reordering PDU, a T1 timer starts operation, and the reordering PDUs that do not have contiguous TSNs are stored in a buffer of the UE. That is, provided that TSNs of the reordering PDUs are not sequentially received, a TSN of the corresponding reordering PDU is set to T1_TSN and the T1 timer starts operation.

If it is assumed that TSNs of the reordering PDUs are sequentially received to the last TSN (T1_TSN) during the operation time of the T1 timer, the UE stops operating the corresponding T1 timer and informs the high-order reassembly entity 1250 of the sequentially received reordering PDUs. If T1_TSN is not received until expiration of the T1 timer, the UE informs the high-order reassembly entity 1250 of all the stored reordering PDUs. If the perfect MAC-ehs SDU or the last segment is decided according to the segmented status field, the reassembly entity 1250 assembles the corresponding information and the previously stored segments, such that it creates one perfect MAC-ehs SDU and informs the corresponding MAC-d or MAC-c of the perfect MAC-ehs SDU.

Figure 13:
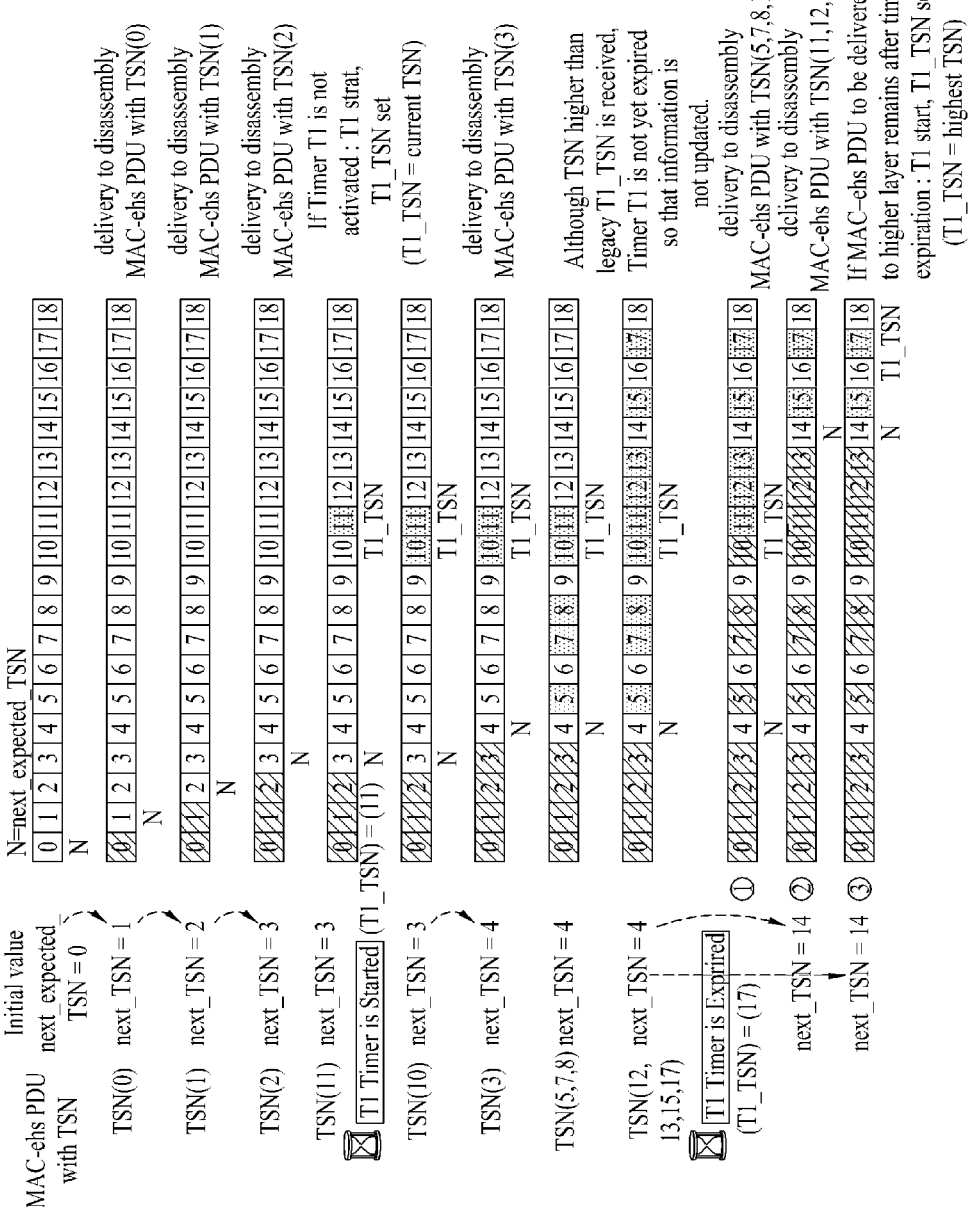
FIG. 13 is a conceptual diagram illustrating a UE reception process when TSNs of the reordering PDUs are not sequentially received until a T1 timer has elapsed.

FIG. 13 is a conceptual diagram illustrating a UE reception process when TSNs of the reordering PDUs are not sequentially received until a T1 timer has elapsed.

Referring to FIG. 12, one MAC-ehs PDU may include three TSNs at maximum, i.e., may receive a maximum of 3 reordering PDUs. However, FIG. 13 shows an exemplary case in which only one TSN is received in one MAC MAC-ehs PDU.

Provided that the UE first receives a MAC-ehs PDU having 'TSN 0', the UE succeeds in receiving TSNs extending to 'TSN 0', a next expected TSN (Next_Expected TSN) is set to 1. Thereafter, the UE transmits the reordering PDU corresponding to the successfully received TSN (TSN 0) to the reassembly entity. After that, the reordering PDUs corresponding to the sequentially received TSNs (TSN 1 and TSN 2) are transmitted to the reassembly entity, and Next_Expected_TSN is changed to 3.

Thereafter, in case of receiving the reordering PDU having TSN 11, since the TSN (i.e., TSN 11) of the received PDU is different from the Next_Expected_TSN, this means that the UE does not sequentially receive the reordering PDUs, such that the corresponding TSN is set to T1_TSN and the T1 timer starts operation. Then, although the UE receives the reordering PDU corresponding to TSN 10, the received TSN is not identical to the Next_Expected_TSN, such that this means that TSNs are not sequentially received, the corresponding reordering PDU is stored and is not transmitted to the reassembly entity. After that, although the UE receives the reordering PDUs having TSN 5, TSN 7, TSN 8, TSN 12, TSN 13, TSN 15, and TSN 17, the received PDUs are not identical to the Next_Expected_TSN, such that the corresponding reordering PDUs are stored and not transmitted to the reassembly entity.

Thereafter, as shown in FIG. 13, if the UE does not receive the corresponding Next_Expected_TSN until expiration of the T1 timer, after the T1 timer has expired, the UE transmits the reordering PDU corresponding to T1-TSN and other reordering PDUs corresponding to TSNs prior to T1_TSN to the reassembly entity (Step 1). In other words, at step 1 of FIG. 13, MAC-ehs PDUs 5, 7, 8 and 10 are transmitted to the reassembly entity. After that, even the reordering PDU in which TSNs located after T1-TSN are sequentially received is transmitted to the reassembly entity (Step 2). As can be seen from FIG. 13, MAC-ehs PDUs 11, 12, and 13 may be transmitted to the reassembly entity. Thereafter, Next_Expected_TSN is changed to "the highest TSN from among the MAC-ehs PDUs transmitted to the reassembly entity +1" (Step 3).

In the example of FIG. 13, if the T1 timer has expired, the UE simultaneously transmits the reordering PDUs having TSNs 5, 7, 8, 10, 11, 12 and 13 to the reassembly entity, and simultaneously transmits RLC PDUs successfully configured in the form of MAC-d PDU or MAC-c PDU to the RLS layer according to the segmentation status field. In this case, the UE has to simultaneously decipher the above-mentioned RLC PDUs, resulting in an increased RLC processing time.

Therefore, the present embodiment multiplexes a plurality of service data units (SDUs) into one unit signal, and performs ciphering/deciphering (encryption/decryption) on the basis of this multiplexed signal.

Ciphering/Deciphering for Each Queue

First, a method for performing ciphering/deciphering for each queue so as to perform reordering according to one embodiment of the present invention will hereinafter be described in detail.

Figure 14:
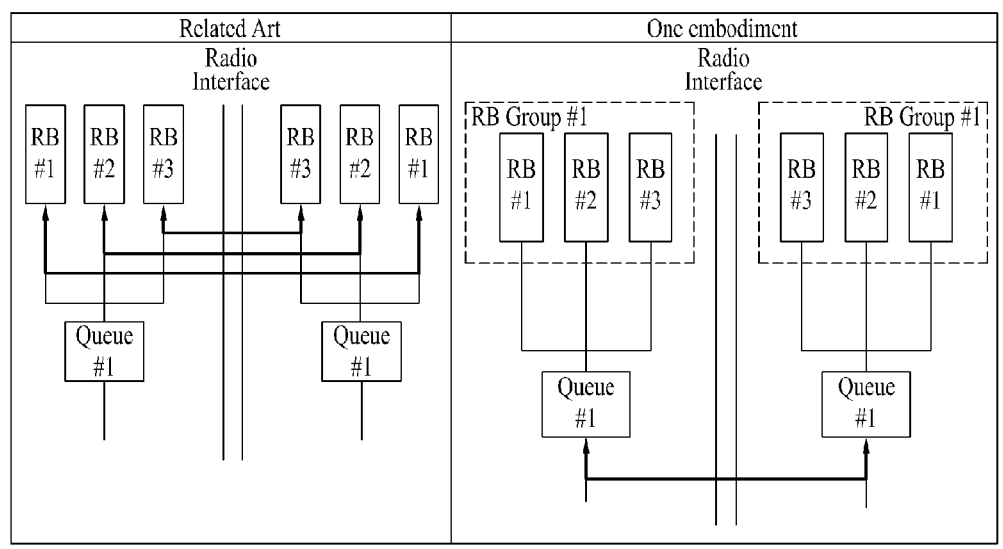
FIG. 14 is a conceptual diagram illustrating a method for performing ciphering/deciphering (encryption/decryption) according to individual queues according to one embodiment of the present invention.

FIG. 14 is a conceptual diagram illustrating a method for performing ciphering/deciphering (encryption/decryption) according to individual queues according to one embodiment of the present invention.

Referring to FIG. 14, if multiple RBs are mapped to one queue, a transmitter simultaneously performs the ciphering process by applying one ciphering setup information to transmission data of multiple RBs mapped to the same queue. The transmitter simultaneously transmits the ciphered data within one radio link. On the other hand, the receiver may decipher (or decrypt) the received ciphered data through one radio link, and may transmit the deciphered or decrypted data to multiple RBs belonging to the same queue.

The present embodiments will hereinafter be described with reference to FIGS. 15 and 16.

Figure 15:
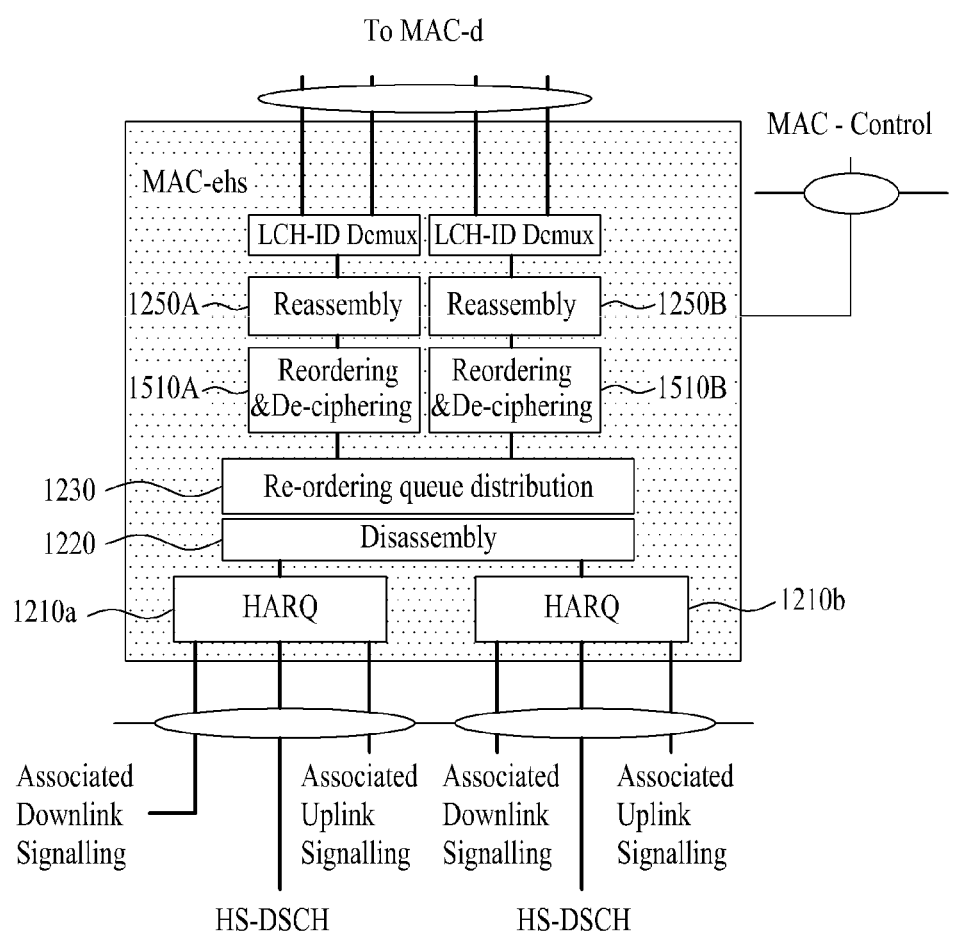
FIG. 15 is a diagram illustrating a MAC-ehs entity structure according to one embodiment of the present invention.

FIG. 15 is a diagram illustrating a MAC-ehs entity structure according to one embodiment of the present invention. FIG. 16 shows a MAC-ehs PDU structure indicating a ciphering unit according to one embodiment of the present invention.

Figure 16:
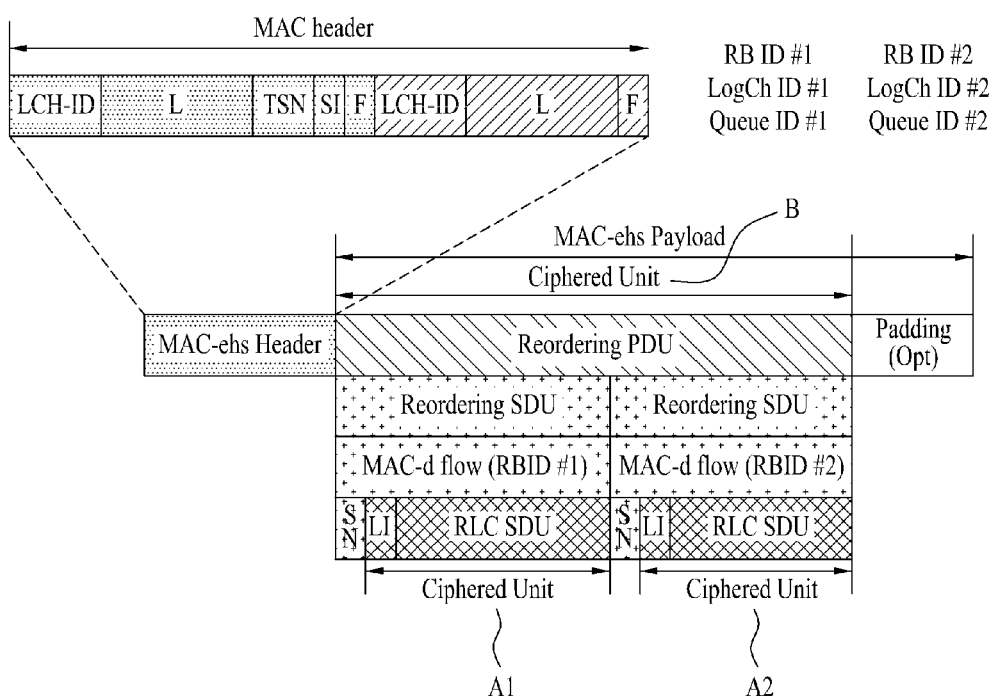
FIG. 16 shows a MAC-ehs PDU structure indicating a ciphering unit according to one embodiment of the present invention.

The ciphering unit proposed by the present embodiment is the reordering PDU stored for each reordering queue in the MAC-ehs entity of the UE, as shown in FIG. 16. In more detail, one reordering PDU composed of one or more reordering SDUs belonging to the same priority queue from among MAC-ehs PDUs is processed by one ciphering unit. FIG. 16 shows the comparison result between the ciphering unit (A1, A2) of the related art and the ciphering unit B of the present embodiment from the viewpoint of the MAC-ehs PDU.

The MAC-ehs PDU structure will hereinafter be described with reference to FIG. 16. For example, it is assumed that an RB ID #1 is mapped to a logical channel #1 and the logical channel #1 is mapped to a queue ID #1. In addition, it is assumed that an RB ID #2 is mapped to a logical channel #2 and the logical channel #2 is mapped to a queue ID #1. It is assumed that the logical channel #1 and the logical channel #2 have the same priority and the UE receives data over the logical channels #1 and #2. The present invention may use one reordering PDU as one ciphering unit, whereas the related art uses one RLC payload other than an SN from among RLC PDUs as one ciphering unit, as shown as a unit denoted by A1 or A2. In the MAC-ehs entity structure shown in FIG. 15, the conventional reordering entity may be changed to the reordering and deciphering entity 1510 as necessary. In other words, the related art temporarily stores the corresponding PDU in the MAC buffer on the condition that an improper TSN is generated in the legacy reordering, and simultaneously transmits the stored PDUs to a higher entity at the expiration time of the T1 timer, resulting in an increased L2 processing time. In order to solve the above-mentioned problem of the related art, the present embodiment performs reordering and at the same time performs deciphering on the basis of a MAC PDU, such that it can maintain a predetermined amount of information to be simultaneously processed.

Operations of the exemplary case that the MAC-ehs entity shown in FIG. 15 is used will hereinafter be described in detail.

MAC-ehs PDU that is received by the UE through the HARQ entities (1210a and 1210b) is transmitted to the disassembly entity 1220 and the reordering queue distribution entity 1230, such that the MAC-ehs PDU is distributed according to individual queue IDs mapped to the MAC-ehs PDU. According to the present embodiment, the reordering and deciphering entities (1510A and 1510B) can perform reordering in response to a TSN of the reordering PDU of the MAC-ehs PDU and at the same time can perform deciphering. Thereafter, the UE may derive several reordering SDUs mapped to the same queue through the reordering process based on the received reordering PDUs, and may transmit reordering SDUs received in response to the order of TSNs, to the reassembly entity 1250.

In case of performing ciphering/deciphering for each queue according to the above-mentioned embodiment, input parameters to be used for the ciphering/deciphering are as follows.

1. Queue ID may be used instead of a conventional RB ID.
2. Instead of a serial number (SN) indicating the Tx/Rx order of data in the RLC layer, a TSN indicating the Rx/Rx order of data in the MAC layer may be used as necessary.
3. Instead of a HFN value that is increased whenever SN is initialized to zero in the RLC layer, a HFN for each queue having a value, that is increased whenever a TSN is initialized to zero in the MAC layer, may be used as necessary Input parameters (CK, Direction, and Length) unrelated to a radio bearer (RB) may be used in the same manner as in FIG. 9.

On the other hand, according to the present invention, the method for multiplexing and deciphering several data units having the same priority, and deciphering the multiplexed unit need not be limited only to several SDUs mapped to the same queue. A method for multiplexing several logical channels having the same priority and ciphering/deciphering the multiplexed result according to one embodiment of the present invention will hereinafter be described.

Figure 17:
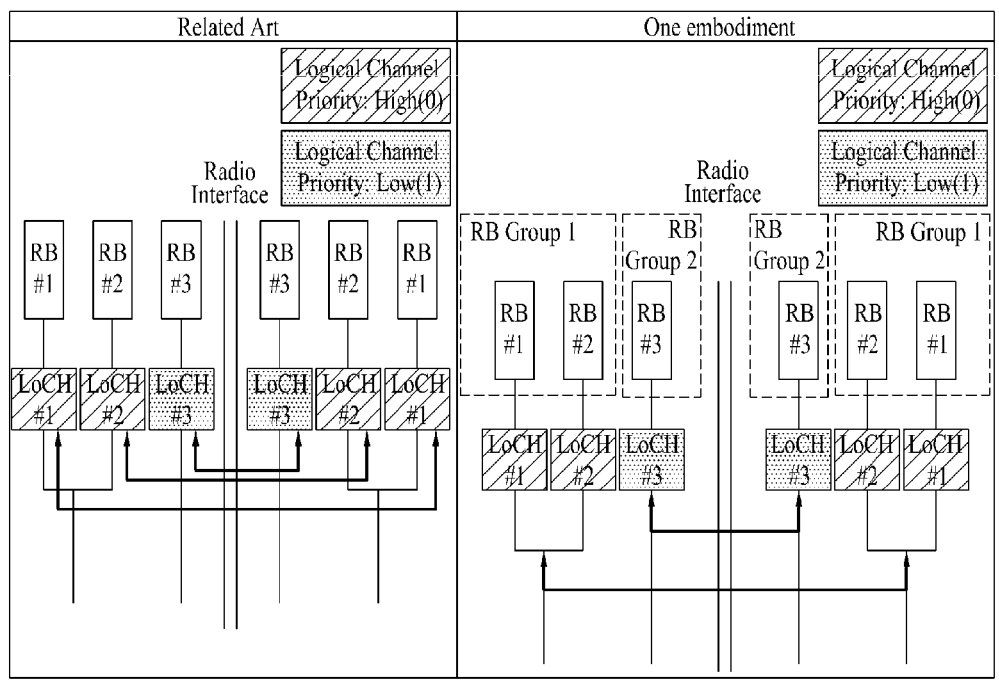
FIG. 17 is a conceptual diagram illustrating a method for multiplexing a plurality of service data units (SDUs) having the same priority so as to perform ciphering/deciphering (encryption/decryption) according to one embodiment of the present invention.

Ciphering/Deciphering Scheme for Respective Logical Channels Having the Same Priority FIG. 17 is a conceptual diagram illustrating a method for multiplexing a plurality of SDUs having the same priority so as to perform ciphering/deciphering (encryption/decryption) according to one embodiment of the present invention.

Referring to FIG. 17, if logical channels having the same priority are mapped to several RBs, the transmitter can simultaneously perform the ciphering process of data that is transmitted from several RBs mapped to the same logical channel, using one ciphering setup information. As a result, the transmitter can simultaneously transmit the ciphered data in one radio link.

On the other hand, the receiver, through one radio link, may decipher the ciphered data using one ciphering setup information such that the receiver can transmit the deciphered data to the RBs mapped to the logical channels having the same priority. For example, FIG. 17 shows that the same logical channels having the same priority are grouped by the transmitter so as to perform the ciphering and deciphering. For example, it is assumed that an RB #1 is mapped to a logical channel #1, an RB #2 is mapped to a logical channel #2, and an RB #3 is mapped to a logical channel #3. Provided that the logical channels #1 and #2 have the same priority and the logical channel #3 has low priority, the transmitter and the receiver according to the present embodiment may collect data received from RBs belonging to the logical channels #1 and #2, such that the ciphering and deciphering of the collected data can be carried out.

In case of using the above-mentioned scheme, the number of calculation times requisite for the ciphering/deciphering process is reduced such that the L2 processing time can be efficiently reduced.

On the other hand, the integrity check indicating the other one of the security related processing will hereinafter be described in detail.

Integrity Check in Units of Multiple SDUs Having the Same Priority

Figure 18:
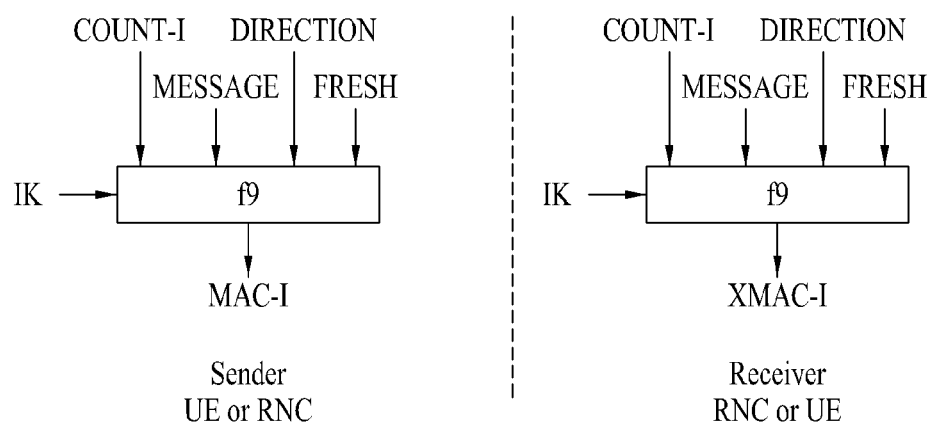
FIG. 18 is a conceptual diagram illustrating a method for performing the integrity check using an F9 algorithm.

FIG. 18 is a conceptual diagram illustrating a method for performing the integrity check using an F9 algorithm.

Presently, the UMTS performs the integrity check of most RRC messages and all control messages transmitted to a higher layer of an RRC. Besides, the ciphering of general user data is performed only. The integrity check is performed in the RRC layer. In order to perform the above-mentioned integrity check, the transmitter and the receiver perform the operations of FIG. 18 using input parameters shown in FIG. 18, such that MAC-I or XMAC-I of 32 bits can be generated. In this case, MAC-I is an integrity check authentication value created in the transmitter, and XMAC-I is an integrity check authentication value generated in the receiver.

In more detail, input parameters for the integrity check may include an Integrity Key (IK), an integrity sequence number (COUNT-I), a random number (FRESH) generated by the network, a DIRECTION message indicating a UL or DL, and a MESSAGE corresponding to the transmitted data. The transmitter may add the MAC-I generated by the above-mentioned input parameters to Tx data, and the receiver may compare the MAC-I extracted from Rx data with XMAC-I generated in the receiver.

Provided that the message transmitted from the transmitter is modified on the way to a destination, MESSAGE input values of the receiver and the transmitter are different from each other, such that XMAC-I is different from MAC-I. Therefore, the receiver compares the MAC-I value with the XMAC-I value. If XMAC-I and MAC-I values are different from each other, this means the presence of a damaged message such that the damaged message is discarded. In the integrity check, the transmitter changes some parts of input values used in the process of FIG. 18 whenever it transmits a new message, such that a new MAC-I can be generated. As a result, it is prevented that a third party watches for an unguarded point of security by reusing the MAC-I value. A detailed function of the F9 algorithm may refer to 3GPP TS 35.201 and TS 35.20.In the UMTE system, the transmitter first performs the integrity check and then performs the ciphering, and the receiver performs the integrity check that compares the MAC-I value extracted from the deciphered data with the generated XMAC-I.

One embodiment of the present invention proposes a method for multiplexing a plurality of service data units (SDUs) having the same priority according to the above-mentioned ciphering/deciphering scheme, and performing the integrity check on the multiplexed unit.

For example, according to one embodiment of the present invention, if several RBs are mapped to one queue, the MAC-ehs entity can simultaneously perform the integrity check of transmission messages of several RBs mapped to the same queue using one integrity check setup information. The above-mentioned scheme for performing the integrity check on the basis of a queue may also be classified as follows.

Method 1 (MAC-I attached to each reordering PDU):

The MAC-ehs entity of the network according to one embodiment of the present invention is configured to perform the integrity check at every reordering PDU. In this case, the integrity check is performed using a queue ID and TSN corresponding to each reordering PDU. In addition, the network may add the integrity check authentication value for each reordering PDU to the rear part of the reordering PDU. In this case, a maximum of 3 MAC-I values may be added to one MAC-ehs PDU. That is, a maximum of 96 bits may be added to one MAC-ehs PDU. When the MAC-ehs PDU is transmitted to the UE, the network MAC-ehs PDU entity may select a Transport Format Resource Indicator (TFRI) indicating the size of transmission data in consideration of the MAC-I size. As described above, the transmitter transmits data including the MAC-I value to one radio link.

Thereafter, the UE receives the reordering PDU including the integrity check authentication value, and compares MAC-I contained in the reordering PDU with X-MAC indicating the integrity check authentication value calculated by the UE-received reordering PDU. If MAC-I is identical to X-MAC, this means the success of the integrity check such that the received reordering PDU is transmitted to a higher entity. In addition, if MAC-I is different from X-MAC, this means the failure of the integrity check such that the received reordering PDU may be discarded.

Method 2 (MAC-I attached to each MAC-ehs PDU):

The MAC-ehs entity of the network according to one embodiment of the present invention is configured to perform the integrity check at every MAC-ehs PDU. In this case, the integrity check may be performed using input parameters corresponding to a queue ID and TSN of the reordering PDU located at the beginning part of the MAC-ehs PDU. Thereafter, the network MAC-ehs entity adds MAC-I to the rear of the MAC-ehs PDU, generates a new MAC-ehs PDU, and transmits the new MAC-ehs PDU to the UE. The UE operations are similar to those of Method 1.

The present invention can be applied not only to the above-mentioned scheme for performing the integrity check on a plurality of SDUs mapped to the same queue, but also to other schemes for performing the integrity check on the basis of several SDUs having the same priority.

On the other hand, the scheme for performing the ciphering/deciphering and integrity check according to the above-mentioned embodiments can be applied to the LTE-A system, specifically, mobile communication systems each including a relay node (RN).

In case of applying ciphering/deciphering and integrity check to Relay Node (RN) of LTE-A System First, the comparison result of the ciphering/deciphering and integrity check for use in the UMTS system and the LTE system is shown in the following Table 1.

TABLE 1

| | Ciphering and Deciphering | | Integrity Check | |
|---|---|---|---|---|
| | UMTS | LTE | UMTS | LTE |
| Same input parameters | Bearer, Direction, Length | — | Message, Direction, Fresh IK | $K_{RRCinr}$ |
| Different input parameters | $CK_{cs}$, $CK_{ps}$ COUNT-C | $K_{RRCenc}$, $K_{LPenc}$ COUNT | COUNT-I | COUNT |

In the LTE system, the ciphering/deciphering and integrity check are performed in a PDCP layer as described above, such that inputs parameters of the LTE system are different from those of the UMTS. Differently from the UTMS, COUNT-C and COUNT-I of the LTE system are set to one COUNT value such that the COUNT-C is identical to the COUNT-I. This COUNT value is comprised of an HFN and a PDCP SN.

In addition, LTE is not used in a CS domain, such that CK is not divided into a CS and a PS. In the LTE, the ciphering key (CK) for ciphering user data is different from the other ciphering key (CK) for ciphering RRC or NAS message. In addition, similar to the UMTS, the LTE first performs the integrity check and then performs the ciphering.

A method for multiplexing data having the same RB through the Uu interface at a relay node (RN) of the LTE-A system, and then performing the ciphering/deciphering and integrity check on the multiplexed result according to one embodiment of the present invention will hereinafter be described in detail.

Figure 19:
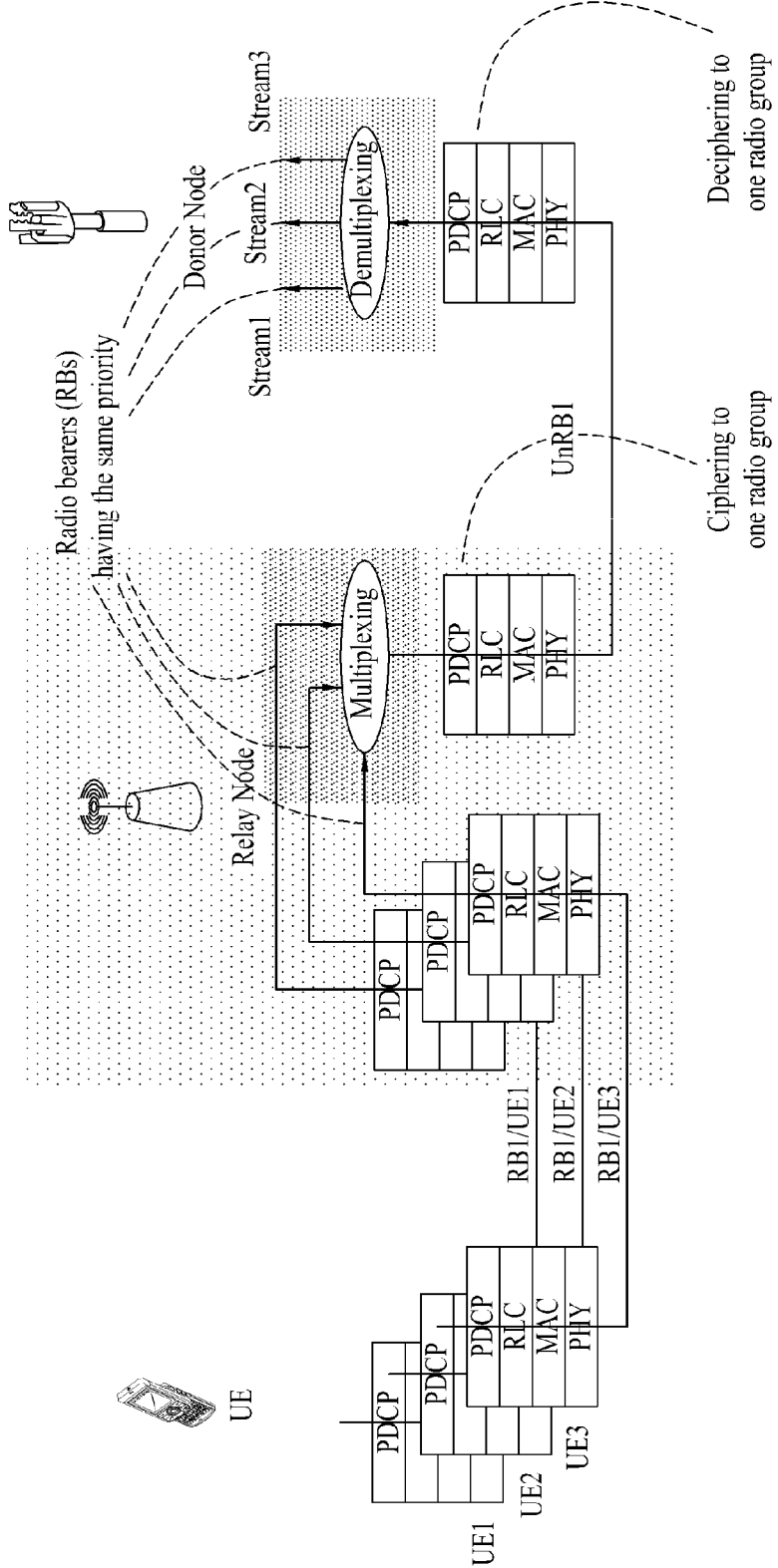
FIGS. 19 and 20 illustrate a method for enabling a relay node (RN) to perform ciphering/deciphering (encryption/decryption) and/or integrity check according to individual radio bearers (RBs) having the same priority according to one embodiment of the present invention.
Figure 20:
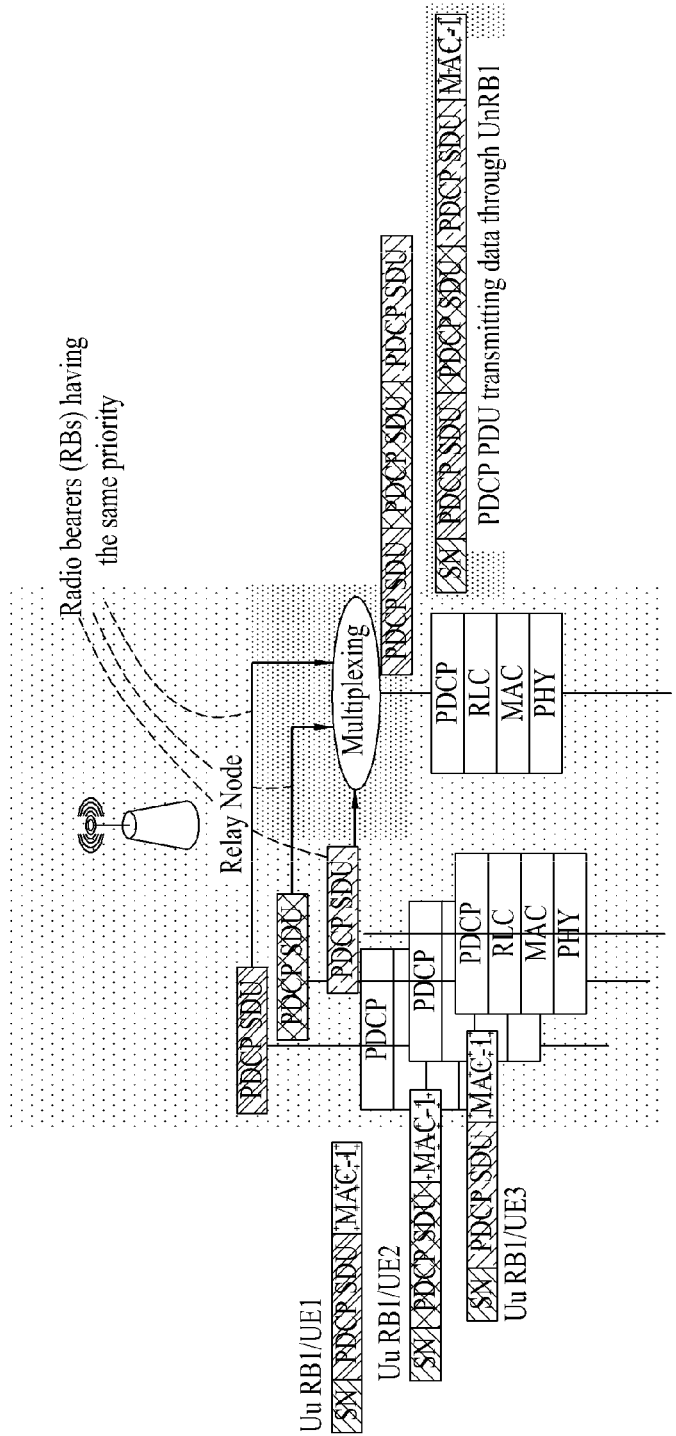

FIGS. 19 and 20 illustrate a method for enabling a relay node (RN) to perform ciphering/deciphering (encryption/decryption) and/or integrity check according to individual radio bearers (RBs) having the same priority according to one embodiment of the present invention.

One embodiment of the present invention proposes a method for enabling a transmitter to integrate UL data carrying several services having the same priority using one ciphering setup information, such that it simultaneously performs the ciphering process using the integrated UL data.

In more detail, referring to FIG. 19, it is assumed that a PDCP entity of the Uu interface of the relay node (RN) is connected to a PDD entity of the UE, and several UEs (for example, UE1, UE2, and UE3) transmit signals from individual UEs to one relay node (RN). The signal transmitted from each UE may be transmitted through a radio bearer (RB) decided according to service categories. For example, if a user who uses Internet surfing transmits a short message (e.g., SMS message), data for the Internet may be transmitted through a first radio bearer (RB) 1 and the short message data may be transmitted through a second radio bearer (RB) 2. The service data having the same priority from among data of multiple users may be transmitted through the same-type radio bearer (RB).

As described above, the same kind of services is performed on data for each UE such that the services may have the same priority. As a result, information of the relay node (RN) may be received through the same kind of RBs from among data received from several UEs. FIG. 19 illustrates an exemplary case in which data received from UE1, UE2 and UE3 is mapped to RB1 and the mapped result is then received.

In this case, in order to transmit PDCP SDUs (where PDCP SDUs are obtained when a PDCP PDU received from a UE PDCP entity is deciphered using an SN of the PDCP PDU) extracted from the PDCP entity of the Uu interface of the relay node (RN) to a donor eNB (DeNB), the relay node (RN) of the present embodiment can multiplex PDCP SDUs of a specific group corresponding to the same RB received from the PDCP entity of the Uu interface. Thereafter, as shown in FIG. 20, if several RBs belonging to one group are contained in the signaling bearer, the integrity check may be performed on the received multiplexed data. After that, the generated MAC-I value may be attached to the rear part of the multiplexed PDCP SDUs.

If the MAC-I value is present in the above-mentioned data, the ciphering process may be performed on the multiplexed PDCP SDUs each having the MAC-I value using one ciphering setup information. If the multiplexed PDDP SDUs belong to the radio bearer (RB) of user data, MAC-I may not be present. After that, the relay node (RN) may transmit one ciphered data corresponding to one RB to the donor eNB through the Un interface.

On the other hand, the PDCP entity of the Un interface of the eNB, that has received one data corresponding to the same RBs through one radio link, may decipher the received data using one deciphering setup information. If the above-mentioned radio bearer (RB) is an RB for user data, the deciphered data is transmitted to a higher IP layer in response to each RB. If the RB is a signaling RB, MAC-I indicating the integrity check authentication value of the received PDCP PDU may be compared with X-MAC calculated by the received PDCP SDUs. If the received MAC-I is different from the calculated X-MAC, this means that the integrity check of the received message is failed, such that the received PDCP PDUs can be discarded. If the received MAC-I is identical to the calculated X-MAC value, the above-mentioned message means the successful integrity check, such that the deciphered data can be transmitted to the higher IP layer in response to each RB.

PDCP SDUs multiplexed in the PDCP entity of the Un interface of the relay node (RN) may be ciphered and deciphered using the COUNT value from among the following ciphering/deciphering input parameters.

PDCP SN indicating a sequence number managed by the PDCP entity of the Un interface of the RN HFN managed by the PDCP entity of the Un interface of the RN On the other hand, differently from the scheme for transmitting signals from the RN to the donor eNB as shown in FIGS. 19 and 20, an exemplary case in which the donor eNB may also transmit signals to the RN may be used as necessary. If the donor eNB may receive data from an MME, that transmits data through signaling RB, through the same RBs, or if the donor eNB receives data from the S-GW, that transmits data through RBs for user data transmission, through the same RBs, the donor eNB performs the ciphering and deciphering process on data belonging to the same RB received from the MME or S-GW, such that the data may be transmitted to the RN. For this purpose, in order to transmit PDCP SDUs extracted from the PDCP entity of the eNB S-MME interface to the RN, or in order to transmit PDCP SDUs extracted from the PDCP entity of the S1-U interface to the RN, the eNB can multiplex PDCP SDUs of a specific group corresponding to the same RB received from the PDCP entity of the S1-MME or S1-U interface.

Thereafter, the integrity check is performed similar to the above-mentioned procedures disclosed in FIGS. 19 and 20, such that the MAC-I value may be attached to the multiplexed PDC SDUs and the aforementioned data may be ciphered. Then, the eNB may transmit one ciphered data corresponding to one RB to the RN through the Un interface.

On the other hand, the PDCP entity of the Un interface of the RN that receives one data corresponding to the same RBs through one radio link may decipher the received data using one deciphering setup information. Thereafter, the deciphering may be performed similar to the above-mentioned procedures disclosed in FIGS. 19 and 20, and the integrity check may also be performed. If the integrity check is successfully performed, the deciphered data may be transmitted to a higher IP layer in response to each RB. If the integrity check is failed, the deciphered data may be discarded.

RRC Signaling for Use in Embodiments Applied to UMTS and LTE-A Systems

The RRC signaling for the ciphering/deciphering and integrity check applicable to the above-mentioned embodiments may store and apply security check setup information when the UE receives the following RRC message. In addition, the security check setup information may be initialized.

In the embodiments applicable to the UMTS, the RRC message received in the UMTS UE may include radio bearer setup, radio bearer setup, radio bearer reconfiguration, physical channel reconfiguration, transport channel reconfiguration, etc.

In the embodiments applicable to the LTE-A system, if the RN receives a RRCConnectionReconfiguration message, the security check setup information contained in the RRCConnectionReconfiguration message may be stored and applied. In addition, the security check setup information may be initialized.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

[Industrial Applicability]

The embodiments of the present invention are applicable to a variety of wireless communication systems such as UMTS, LTE, LTE-A, etc. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for transmitting a signal by a transmitter to a receiver over a radio frequency (RF) channel, the method comprising:
   multiplexing, by the transmitter, a plurality of service data units (SDUs) to form a unit signal, the plurality of SDUs having a same priority and being mapped to a radio bearer (RB), wherein the plurality of SDUs are user data;
   ciphering, by the transmitter, the unit signal using a mask to generate a ciphered unit signal, the mask generated by a first parameter combination that includes a plurality of ciphering parameters, the plurality of ciphering parameters including a ciphering key (CK), a count value, a radio bearer identifier (RB ID) corresponding to the multiplexed SDU, and a length of the mask; and
   transmitting, by the transmitter, the ciphered unit signal to the receiver over the RF channel.

2. The method according to claim 1, further comprising:
   adding an integrity check authentication value signal to the unit signal, the integrity check authentication value signal generated using a second parameter combination,
   wherein the ciphered unit signal is obtained by adding the integrity check authentication value signal to the multiplexed unit signal.

3. The method according to claim 1,
   wherein the transmitter is a relay node (RN) and the receiver is a base station,
   wherein the unit signal is a multiplexed SDU, and
   wherein the plurality of SDUs correspond to a plurality of user equipments (UEs).

4. The method according to claim 3, further comprising:
   adding, by the RN, an integrity check authentication value signal to the multiplexed SDU, the integrity check authentication value signal generated using a second parameter combination, and
   wherein the ciphered unit signal is obtained by adding the integrity check authentication value signal to the multiplexed SDU.

5. The method according to claim 4, wherein the second parameter combination includes a key, a count value, a message indicating the multiplexed SDU, a direction parameter indicating whether the signal transmission is uplink transmission or downlink transmission, and a radio bearer identifier (RB ID) corresponding to the multiplexed SDU.

6. The method according to claim 1, wherein the RB comprises a plurality of RBs having the same priority, and wherein the unit signal is a multiplexed SDU.

7. A transmitter configured to transmit a signal to a receiver over a radio frequency (RF) channel, the transmitter comprising:
   a processor configured to:
      multiplex a plurality of service data units (SDUs) to form a unit signal, the plurality of SDUs having a same priority and being mapped to a radio bearer (RB), wherein the plurality of SDUs are user data;
      cipher the unit signal using a mask to generate a ciphered unit signal, the mask generated by a first parameter combination that includes a plurality of ciphering parameters the plurality of ciphering parameters including a ciphering key (CK), a count value, a radio bearer identifier (RB ID) corresponding to the multiplexed SDU, and a length of the mask; and
      transmit the ciphered unit signal to the receiver over the RF channel.

8. The transmitter according to claim 7,
   wherein the processor is further configured to add an integrity check authentication value signal to the unit signal, the integrity check authentication value signal generated using a second parameter combination, and wherein the ciphered unit signal is obtained by adding the integrity check authentication value signal to the multiplexed unit signal.

9. The transmitter according to claim 7, wherein the transmitter is a relay node (RN) and the receiver is a base station, wherein the unit signal is a multiplexed SDU, and wherein the plurality of SDUs correspond to a plurality of user equipments (UEs).

10. The transmitter according to claim 9, wherein the processor is further configured to add an integrity check authentication value signal to the multiplexed SDU, the integrity check authentication value signal generated using a second parameter combination, and wherein the ciphered unit signal is obtained by adding the integrity check authentication value signal to the multiplexed SDU.

11. The transmitter according to claim 10, wherein the second parameter combination includes a key, a count value, a message indicating the multiplexed SDU, a direction parameter indicating whether the signal transmission is uplink transmission or downlink transmission, and a radio bearer identifier (RB ID) corresponding to the multiplexed SDU.

12. The transmitter according to claim 7, wherein the RB comprises a plurality of RBs having the same priority, and wherein the unit signal is a multiplexed SDU.

* * * * *